United States Patent [19]

Staab et al.

[11] Patent Number: 5,142,623
[45] Date of Patent: Aug. 25, 1992

[54] HIGH PERFORMANCE MEMORY IMAGING NETWORK FOR A REAL TIME PROCESS CONTROL SYSTEM

[75] Inventors: Carl J. Staab, Plub Boro; Robert W. Boehmer, Carnegie; Kirk D. Houser, Ross Twp., Allegheny County; Donald J. Jones, O'Hara Twp., Allegheny County; Robert T. Ihrman, Indiana Twp., Allegheny County; Donald A. Poepsel, Harmar Twp., Allegheny County; Warren A. Edblad, Penn Hills Twp., Allegheny County, all of Pa.

[73] Assignee: Westinghouse Electric Corp., Pittsburgh, Pa.

[21] Appl. No.: 205,269

[22] Filed: Jun. 10, 1988

[51] Int. Cl.⁵ .............................................. G06F 13/00
[52] U.S. Cl. ................................. 395/200; 364/DIG. 1
[58] Field of Search ... 364/200 MS File, 900 MS File; 370/111, 82, 94.1, 105.1, 85.6, 85.5

[56] References Cited

U.S. PATENT DOCUMENTS

| | | | |
|---|---|---|---|
| 4,177,450 | 12/1979 | Sarrand | 395/200 |
| 4,404,557 | 9/1983 | Grow | 370/85.5 |
| 4,430,699 | 2/1984 | Segarra et al. | 364/200 |
| 4,477,882 | 10/1984 | Schumacher et al. | 364/900 |
| 4,550,366 | 10/1985 | Toyama et al. | 364/900 |
| 4,586,175 | 4/1986 | Bedard et al. | 370/85.6 |
| 4,623,886 | 11/1986 | Livingston | 370/85.6 |
| 4,628,504 | 12/1986 | Brown | 370/85.1 |
| 4,667,323 | 5/1987 | Engdahl et al. | 370/85.6 |
| 4,677,612 | 6/1987 | Olson et al. | 370/94.1 |
| 4,747,100 | 5/1988 | Roach et al. | 370/85.5 |
| 4,761,778 | 8/1988 | Hui | 370/46 |
| 4,819,230 | 4/1989 | Caluigac et al. | 370/94.1 |
| 4,888,726 | 12/1989 | Struger et al. | 364/900 |
| 4,918,589 | 4/1990 | Floro et al. | 364/900 |

FOREIGN PATENT DOCUMENTS 130802  1/1985  European Pat. Off.
132069  1/1985  European Pat. Off.

Primary Examiner—Stuart N. Hecker
Assistant Examiner—Rebecca L. Rudolph
Attorney, Agent, or Firm—M. G. Panian

[57] ABSTRACT

A data communications arrangement for a distributed processor control system having a number of stations which can send and receive control data, includes a communications processor at each station effective for controlling the flow of control data over a serial communications bus. The communications processor is coupled to a dual ported memory device along with a functional processor which is effective for carrying out the actual operations of the process. The communications control processor is further effective for assembling frames of control data according to a predetermined arrangement which gives a timing preference to a first category of data over a second category of data. The assembled frame of control data will then include all of the first category of data and, with time remaining from a timing goal, will include a portion of the second category of data.

15 Claims, 4 Drawing Sheets

| | | | |
|---|---|---|---|
| | | –Preamble | T200 |
| Pre | Flg | –Preamble continued / Opening flag (01111110) | T201 |
| A | C | –Token | T202 |
| FAST OFF. | | –Memory offset to this FAST data | T203 |
| NQAF OFF. | | –Memory offset to this NQAF data | T204 |
| N | M | –Number of words of FAST data / NQAF data | T205 |
| | | –1'st word FAST data | |
| • • • | | –N'th word of FAST data | T206 TO T208 |
| • • • | | –1'st word of NQAF data –M'th word of NQAF data | |
| CRC | | –Cyclic Redundancy Check | T209 |
| Flg | | –Closing flag (01111110) | T210 |

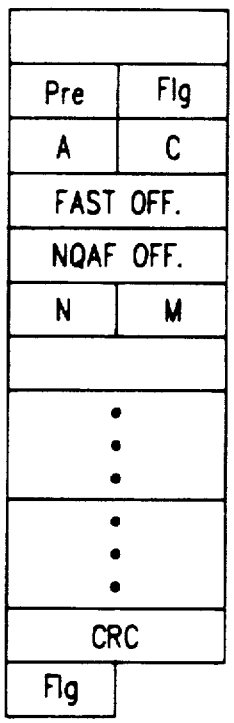

| | |
|---|---|
| −Preamble | T200 |
| −Preamble continued / Opening flag (01111110) | T201 |
| −Token | T202 |
| −Memory offset to this FAST data | T203 |
| −Memory offset to this NQAF data | T204 |
| −Number of words of FAST data / NQAF data | T205 |
| −1'st word FAST data | |
| ⋮ | |
| −N'th word of FAST data | T206 TO T208 |
| −1'st word of NQAF data | |
| −M'th word of NQAF data | |
| −Cyclic Redundancy Check | T209 |
| −Closing flag (01111110) | T210 |

FIG. 4

Block 1 −
| | |
|---|---|
| The node ID number which originates this data block | (word) |
| This node in service flag | (word) |
| Number of words of FAST data this node originates | (byte) |
| Number of words of NQAF data this node originates | (byte) |
| Maximum number of NQAF words to include in each frame | (word) |

Block 2 −
| | |
|---|---|
| The node ID number which originates this data block | (word) |
| This node in service flag | (word) |
| Number of words of FAST data this node originates | (byte) |
| Number of words of NQAF data this node originates | (byte) |
| Maximum number of NQAF words to include in each frame | (word) |

⋮

Block 64 −
| | |
|---|---|
| The node ID number which originates this data block | (word) |
| This node in service flag | (word) |
| Number of words of FAST data this node originates | (byte) |
| Number of words of NQAF data this node originates | (byte) |
| Maximum number of NQAF words to include in each frame | (word) |

FIG. 5

HIGH PERFORMANCE MEMORY IMAGING NETWORK FOR A REAL TIME PROCESS CONTROL SYSTEM

BACKGROUND OF THE INVENTION

1. Field of the Invention

This invention relates to a method and arrangement of providing real time process control by means of multiple communication networks. More particularly, this invention relates to such a process control arrangement which achieves extremely rapid response times for the processes being controlled by utilizing multiple, independent communications networks one of which is configured to operate in a very rapid manner relative to any other of the communication networks.

2. Description of the Prior Art

In the field of process control systems, recent developments in industrial automation have evolved from those in which a single supervisory computer controlled the process to those using a distributed system of dedicated microprocessors each responsible for a small aspect of the operation of the total control system. As a result of this reliance on a more distributed approach to process control, there has arisen a commensurate need to develop and refine communication schemes between the plurality of processors to insure that the process would be completed or executed in a timely manner. One example of such a distributed process control configuration is the Westinghouse WDPF TM system which has been applied to a wide range of industrial process control operations and is discussed in European Patent Application Nos. EP 0 132 069 and 0 130 802 which are assigned to the same assignee as the present application. In an application of this type of system to an industrial process control configuration, response times of 0.1 to 1.0 seconds could be adequately provided. However, as with other industrial process control configurations, tightly coupled control systems requiring response times of 25 milliseconds or less could not be adequately provided for. This comes about as a result of the fact that a typical data base management network is concerned not so much with raw communications speed but rather, with overheads associated with the data base management operation and with the communications protocols associated with the communications network. Ideally, the control algorithm or master control program in each distributed process control unit, whether microprocessor, minicomputer or otherwise based, would directly access remote data from other units in the same manner that it accessed local data; that is, by accessing data directly from memory without delay or having to consider the actual source or destination of the data.

In a process control system where it is required to provide for such a relatively rapid response time, there generally exists a wide diversity in the types of data that are being processed and, in the usage of that data. This wide diversity consequently results in a broad spectrum of data transfer rates. Typically, a single communication network can address very high data rates for limited amounts of data or larger amounts of data for proportionally reduced data rates.

An example of a process control system that would require such a wide diversity in the timing constraints for the different types of data would be a rolling mill process control system for a steel rolling operation. In such a system, it can be appreciated that as a work piece, which in this example is a steel slab, is transported from one roll stand to another, the process of rolling that steel slab into the exact gauge of steel desired, requires precise coordination between the speed and positioning information of the respective roller assemblies at these roll stands. In addition to the rapid coordination of the speed and positioning information, the overall rolling mill operation deals as well with information for which the timing is not as critical; an example of such information is the historical data which provides the records of how the process has operated from an overall system viewpoint.

Recognizing this need for the rapid handling of certain information, one example of a prior art process control system that could be applicable, utilizes a communications scheme whereby the initialization of the receiving and transmitting stations is accomplished by means of a connecting link rather than a master control unit, such example being found in U.S. Pat. No. 4,177,450 which issued to P. Sarrand on Dec. 4, 1979. In this patent, the described communication arrangement provides that activity on the connecting link is monitored by each station and, based on a predetermined timing scheme, an initiation signal can be transmitted when there has been a lack of activity on the link. Additionally, this patent discloses that the predetermined timing scheme allows the setting of different take over times for the different stations depending on the priority of the various stations. Though this approach does provide for the rapid handling of some data communications between various stations, the effort necessary to establish the timing scheme would appear to be cumbersome in addition to the fact that the flexibility one might desire for the purpose of modifying the overall station arrangement, is greatly reduced. In addition, this approach only provides for one type of communications handling scheme and does not provide for handling different categories of data in different manners so that a more precise handling of data for certain operations can be done.

A further advantage realized as a result of the progress made in using multiple processors in a distributed processing system is the ability to configure the overall system in a variety of manners that allow for the efficient interconnection of process functions that are separated in operating characteristics as well in physical distance. For example, multiple processor systems have been configured in what is known at a ring network in which the number of processor drops or stations are circularly arranged to tie into a ring shaped communications system. It can be appreciated that in a distributed process control system for an industrial application, the actual length of cable over which the ring communication system is configured can be of such a length as to reduce the efficiency of transmitting information thereover. Accordingly, though the use of the multiple processor configuration for an industrial operation may be spread out over a large factory floor area, care must be taken that the actual physical layout does not adversely impact on the efficient communication of information among the various processing units that make up the system.

Another multiple processor distributed processing configuration that has been utilized is commonly referred to as a star configuration which can be characterized by the use of a central processing unit with multiple satellite processing units extending radially outward therefrom along distinct communications links. In this configuration, typically, the processing unit at the core of the star is designated a master processor through which the communication and processing of all information must be coordinated. In addition to suffering from the need to include lengthy communication lines, such a configuration also suffers in that the passing of information through the master processor further tends to slow down the efficient communication of information between the various processor units.

The desired time for communicating information between the multiple processor units that comprise a distributed processor process control system can be considered at least partially to be a function of the efficiency of using the raw data rate of the actual processor devices or CPUs that make up the individual processor units. It can be appreciated that as response times have become faster, more processor operations such as instructions or data transfers can be performed in a shorter time period if the faster response time is better utilized. Therefore, it would be advantageous if a communications arrangement for a multiple processor distributed processing control system could approach the raw data rate of the processing device as nearly as possible thereby increasing the speed at which data can be communicated between the various processing units of the system. By better utilizing the raw data rate of the processor device for communicating data between the various processor units, a further advantage that can be realized is in the area of error detection and correction techniques. As a faster communication arrangement is achieved, obviously, more data can be transmitted in the critical time necessary to accurately perform the process. Accordingly, redundant communications can be sent thereby offering the advantage of providing an inherent error detection and correction technique. Additionally, the ability to send more data in the critical time period also allows the inclusion of data checking information along with the basic data being transmitted.

SUMMARY OF THE INVENTION

It is therefore an object of this invention to provide a communications arrangement for a distributed process control system whereby information can be designated as priority data and can be communicated to various locations in a very fast time period relative to information which is not designated as priority information or which is not as critical as the priority data.

With this object in view, this invention provides a communications arrangement for communicating data which has been separated into at least a first and a second category of data as a function of a priority assignment preselectively made based on the timing requirements of the distributed process control system. The communications arrangement includes a communications control processor which controls the transmission of data over a serial bus on which all of the stations are disposed. The communications control processor is coupled in signal communication to one port of a dual port memory device in which all data from all stations which originate data of the first category and which is designated as priority data, is stored in a common address allocation arrangement so as to constitute a shared memory. A functional processor which performs the actual operations necessary to carry out the control process, is coupled to the second port of the dual port memory device. The communications control processor includes means for assembling a frame of data in which the first category of data is assigned a timing preference such that all of the first category data will be transmitted before the second category of data. A means for calculating an actual time needed to transmit all of the first category of data and for subtracting this actual time from a predetermined timing goal to determine a timing difference value is provided which is effective for communicating this information to the communications control processor. A means for determining a remainder amount of the second category of data as could be transmitted in the time difference value is also provided which is further effective for adding such remainder amount of the second category of data to the first category of data for transmission therewith during the predetermined timing goal.

The communications arrangement could further include means for assigning mastership of the serial bus to one of the stations at a time and to allow for the transfer of that bus mastership to a next station in a predetermined order of priority. The communications arrangement could still further provide means for checking for the freshness of data that originates from any of the stations and for determining, following the expiration of one of a preselected timeout periods, whether the assignment of the bus mastership should be restarted to the first station in a bus allocation list.

BRIEF DESCRIPTION OF THE DRAWINGS

FIG. 4 is a tabular representation of the data format for an information frame to be transmitted on the communication system of the present invention.

FIG. 5 is a tabular representation of the frame control format for the communication system of the present invention.

DESCRIPTION AND OPERATION

Figure 1:
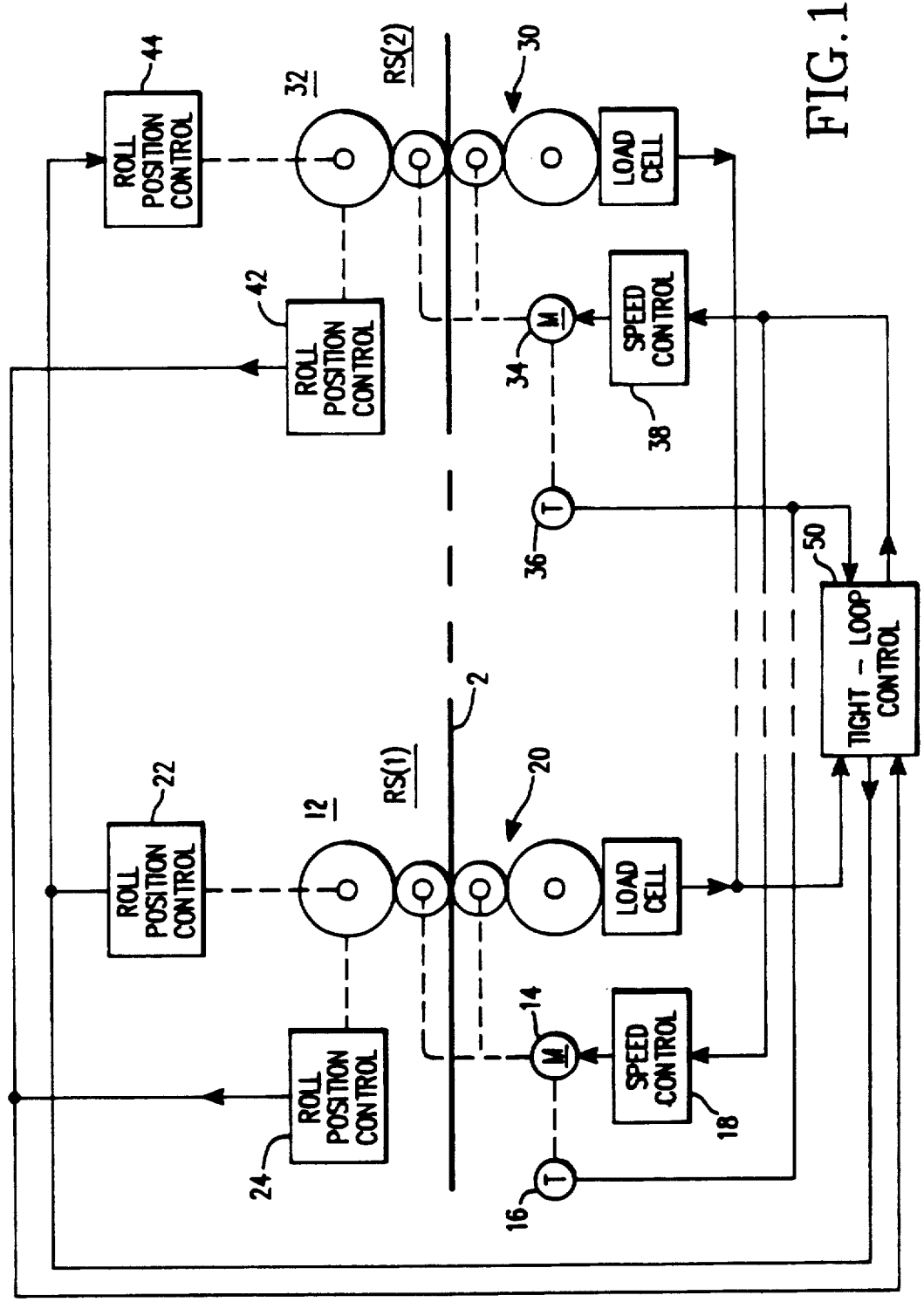
FIG. 1 is an schematic view, partly in block diagram form, of a process for which the present communication system is applicable.

The rolling mill process configuration illustrated in FIG. 1 is but one example of an industrial process to which the present invention is applicable. A process control system to be used on such a configuration must perform supervisory control over the entire process as well as a specific, tight loop control over such parameters as the speed and positioning of the roller assembly 12. An example of an existing gauge control system for a rolling mill operation can be found in U.S. Pat. No. 3,892,112 which issued on Jul. 1, 1975 to A. W. Smith et al. and which is assigned to the same assignee as the present invention.

It is known that, in a rolling mill operation, precise coordination is required between the control parameters of adjacent roll stands. In order to prevent the stretching, pinching or buckling of the steel slab 2 as it is transported from a one roll stand 20 to a next roll stand 30, it is necessary to rapidly correct any deviation of the control parameter measured value from the preselected values for those control parameters. It can be appreciated that, in the rolling mill process, if the speed of the second set of rollers 32 is higher than desired, the effect will be the stretching of the steel slab 2 so as to result in a structural defect in that steel which, if the speed deviation continues or in fact worsens, results in a more pronounced defect in that run of steel. Similarly, if the speed of the second set of rollers 32 is slower than desired, the first set of rollers 12 will in effect, push the steel slab 2 causing the slab to buckle since the second set of rollers could not accept the slab 2 in as rapid a manner as desired.

In addition to the precise control of the speed control signals, it is also necessary to precisely coordinate the roller position signals so that the proper gauge of steel is achieved. In fact, any information which can be considered to be control data; that is, information which directly affects the control of the rolling mill operation, must be included under the control of a tight loop control arrangement 50 that allows for a response to a deviation in the expected value in as short a time period as possible, typically on the order of 30 milliseconds or less.

Therefore, as seen in FIG. 1, a conventional rolling mill system having a number of roll stands, designated in this illustration as a first roll stand 20 and a second roll stand 30, also includes transducer devices to measure the values of the data that must be tightly controlled and, control devices to effectuate the desired controls. A first motor 14 controls the speed of the first set of rollers 12, which as illustrated, include a pair of backup rollers 12a and a pair of work rollers 12b in the conventional manner. The first motor 14 can be a large DC motor which is controllably energized at the roll stand 20 over a speed control device 18 to achieve the desired speed of the rollers 12. A first speed transducer 16 is coupled to the motor 14 to provide a feedback signal to the tight loop control arrangement 50 that is a measurement of the speed of the first set of rollers 12. A first roll position control device 22 controls the opening of the first set of rollers 12 through which the work piece, the steel slab 2, is transported. A first roll position detector 24 provides the tight loop control arrangement 50 with a measurement signal representative of the position of the first set of rollers 12.

Similar to the arrangement for the first roll stand 20, the second roll stand 30 includes a second motor 34, a second speed control device 38 and second speed transducer 36 for respectively controlling and monitoring the speed of the second set of rollers 32. Additionally, the second roll stand 30 includes a second roll position control device 42 and second roll position detector 44 for respectively controlling and monitoring the position of the second set of rollers 32.

The tight loop control arrangement 50 shown in FIG. 1 is merely exemplary of the communications arrangement of the present invention which allows for the separation of data into categories such that certain data can be given preferential treatment in terms of the timing priority of transmitting that data. Though illustrated in FIG. 1 as a single block diagram element for the entire array of roll stands, it should be understood that this representation signifies that the communications arrangement is a shared system among the stations which, in this example are illustrated as roll stands. As will be discussed hereinafter in further detail, the communications arrangement includes similar yet distinct components at each individual station.

Figure 2:
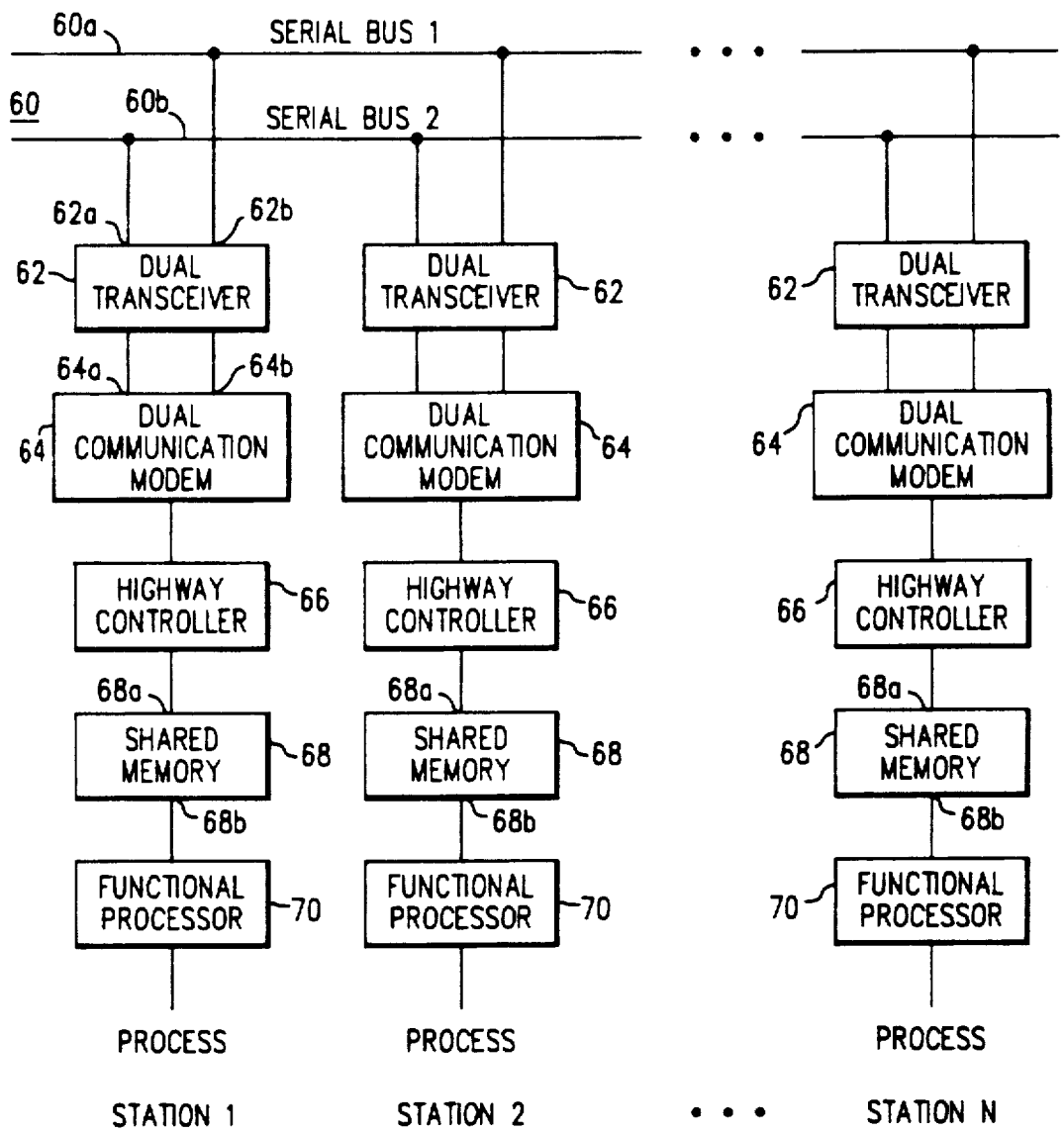
FIG. 2 is a functional block diagram of a communication system for a process control system constructed in accordance with the present invention.

As seen in FIG. 2, the communications arrangement of the present invention includes a serial communication bus 60 on which all of the stations that make up the distributed process control system are connected. Although a single redundant communication bus 60 is illustrated, it is the intention of the present invention that this serial communications bus 60 be a dedicated bus; that is, this serial link only accommodates data of a certain type and all other data must be communicated over another communications bus. In a typical process control system, it should be understood that there are different types of data which have different requirements as to the timing and the manner of handling that data. As an example, there are quite distinct requirements for handling data which can be categorized as control data from that which can be categorized as historical data. In the example of the control data, that is, data which effects the control of or indicates the operation of the process itself, the time to refresh that data within the memory devices of the distributed processors, must be such that the operation of the process is not adversely affected. On the other hand, data which may be utilized for the purpose of updating the display information by which an operator monitors the operation of the process, does not have to be refreshed in the same time frame as the control data. In practice, it has been determined that some control data must be refreshed in a time period of 5 milliseconds while other control data need only be refreshed in a time frame of 30 milliseconds. Historical or display information however, need only be refreshed in a time frame of 100 milliseconds to 1 second which is the response time in which previously provided distributed process control systems have operated. Accordingly, it would be advantageous to segregate display information from control information. This can be accomplished by providing separate communication buses over which the two types of information are communicated; for the present disclosure however, only the communications bus 60 which accommodates the control data is illustrated. The description and operation relating to a system for separating information onto distinct communication buses according to the classification of that data as control data or historical data can be found in a separate patent application filed concurrently herewith and entitled "Real Time Process Control Using Multiple Communications Networks"; such application having issued as U.S. Pat. No. 4,928,097 on May 22, 1990 and being assigned to the same assignee as the present invention.

The serial communications bus 60 illustrated in FIG. 2 is shown as a redundant system; that is, in practice, a first and a second serial bus 60 are provided. The first serial bus 60a and the second serial bus 60b are identical and merely provide a backup to one another in the event of a fault condition occurring in one or the other of the serial buses 60a or 60b.

In order to realize the benefit of a dual communication bus configuration, it would be necessary to provide a dual transceiver arrangement 62 which includes redundant first and second transceiver devices 62a and 62b placed at each station. The redundant transceiver device 62 is connected to the redundant serial communication buses 60a and 60b and provides the actual connection of the stations to the communications network. As illustrated, the transceiver devices 62 are connected to the serial communication bus 60 in a coaxial manner; it can be appreciated that a fiber optic link between the transceiver devices 62 and the communication bus 60 can be provided as well.

Associated with each of the transceiver devices 62 is a dual communication modem 64 which, as shown in FIG. 2, is also a redundant system; that is, a dual data communication modem is provided at each station of the distributed process control system for converting the data to or from the serial format which is used on the serial communications bus 60. The dual data communications modem 64 includes a first and second communication modem 64a and 64b and can also be configured to provide the means by which the message which originates from each of the stations, can be stripped of such information as the framing information which sets out the boundaries of the messages, and the cyclic redundancy information which provides an error checking capability for the message transmission.

From the dual communications modem 64, the data is communicated to the communications control processor 66 which in the present embodiment, is a high speed, bit-slice processor which controls the allocation of the serial communications bus 60, provides for error recovery and message formatting and, in addition, controls the actual transmission and reception of data over the serial communications buses 60a and 60b.

Information which is transmitted and/or received over the serial communications bus 60 under the control of the communications control processor 66 is loaded into a first port 68a of dual ported shared memory device 36 which is common to each of the stations. The memory device 68 provides the means by which the present invention allows for maintaining multiple distributed copies of a common memory area as will be explained hereinafter in further detail in connection with FIG. 3.

Connected at the second port 68b of the memory device 68 is a functional processor 70 which provides the means by which the overall process of the distributed process control system is carried out. For the purpose of this disclosure, it is only necessary to understand that the functional processor 70 is programmed to carry out the intended process based on the control data that it has available to it from the second port 68b of the shared memory device. Additionally, it should be understood that the functional processor 70 also outputs information to the second port 68b of the memory device; information transmitted in this direction comprises control data which indicates the status of the process and the control operations being performed thereon. For a more detailed understanding of the operation of the functional processor 70, reference can be made to the aforementioned European Patent Application No. EP 0 132 069 wherein the operation of a distributed process control system having a functional processor is described.

As indicated in FIG. 2, the process which is performed by the distributed process control system is essentially irrelevant to the operation of the communications arrangement of the present invention. Though FIG. 1 describes the process as a steel rolling mill operation, it can be appreciated that the communications arrangement of the present invention can be equally effective on other types of industrial processes that recognize the necessity of segregating the transmission of certain types of information based on the timing priority of that information. An example of another industrial process for which the present invention would be applicable is a robotic welding operation where the positioning of the welding head relative to the seam to be welded must be tracked to a precise degree in terms of response times.

The dual ported memory device 68 described in physical terms in connection with FIG. 2, allows for the use of the multiple distributed copies of a common memory area by means a preselected organization of the memory area. In other words, each copy of the memory is organized identically and is updated continuously by the communications arrangement of the present invention. In this manner, the communications arrangement of the present invention can eliminate the need to include data base management information and data filtering capabilities on the communications bus 60 thereby reserving the communication of control information only to the communications bus 60. In addition, rather than providing that the control information include data indicating the source and/or destination of the control data, the control information is communicated in a broadcast manner; that is, by providing for identically organized memory copies at each of the stations, only the control data and a memory offset representative of the memory position into which the data must be loaded, need be transmitted over the serial communications bus 60. This memory sharing approach provides that the identical memory image will be maintained in the memory devices 68 at each of the stations. In other words, each station will have preselected specific memory locations reserved at all of the stations for that control information which originates at the particular station, and furthermore, the specific memory locations will all have the identical control data stored therein.

Figure 3:
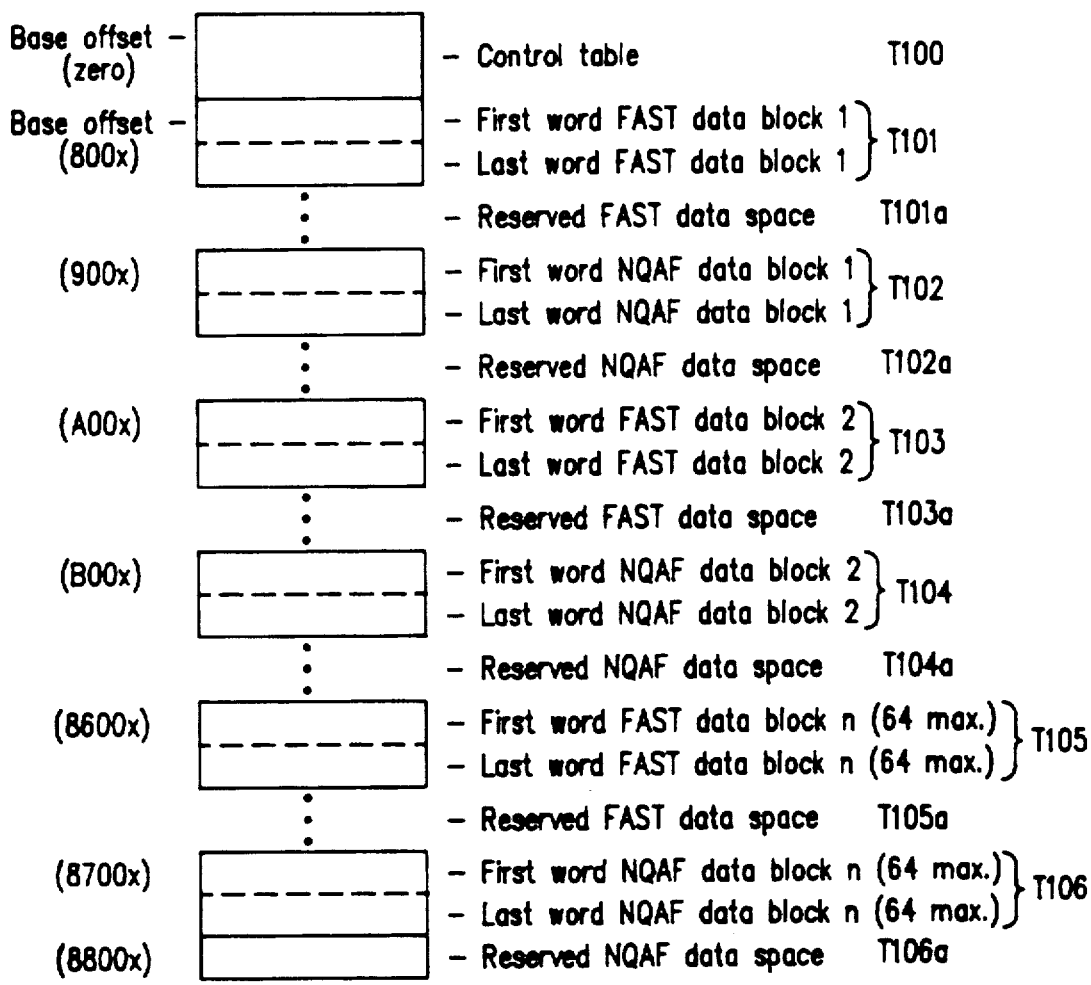
FIG. 3 is a tabular representation of the shared memory space allocation format utilized in the communication system of the present invention.

As seen in the tabular representation of the memory space allocation in FIG. 3, the organization of the memory spacing within the memory device 68 begins with a memory space having a memory offset designation of zero. The memory offset designations are illustrated along the righthand column of FIG. 3 and serve only as exemplary representations of memory locations assignable within the dual ported memory device 68. The control data at any given memory offset location from the start of the memory area will be the same variable in all of the stations. The communications control processor 66 moves the control data from the memory of the station which originates the value to the same relative memory offset location at all of the other stations. It can be appreciated that the memory offset designations can change according to application needs of the process being controlled as well as according to the size and type of memory device being utilized.

The memory space beginning at memory offset value zero is reserved for a control table designated reference number T100 which provides the formatting method common to all stations connected to the serial communications bus 60. The control table T100 occupies a contiguous block of shared memory that contains control and status registers which are used to initialize the communications control processor 66 and to diagnose communications faults as will be described hereinafter in further detail. The control table T100 also contains a bus allocation list (BAL) which determines the sequence in which the control of the serial communications bus 60 will be passed between the stations. Additionally, the control table T100 contains a frame control table which defines the data to be broadcast in each message frame and is described in relation to FIG. 4.

Following the memory area reserved for the control table T100 at each station, space is reserved for the storage of the control data itself. The control data memory area as configured in FIG. 3, is made up of 128 blocks of control data wherein each block of data is comprised of 128 words of control data information. The data blocks are allocated among the various stations in pairs and further more, contain all of the data which is broadcast by the station and that which is received from all of the other stations. It would be appreciated that for various applications of a distributed process control system, the communications arrangement of the present invention can be configured so that some of the stations only receive control data, they do not broadcast any control data back onto the serial communications bus 60. In this situation, the receive only station would include the same system components as illustrated in FIG. 2 and would also utilize the same shared memory arrangement as shown in FIG. 3.

Control data which is associated with a particular station is organized so as to occupy a pair of contiguous blocks of memory space. As seen in FIG. 3, the first block of control data which begins at memory offset (800×), is designated as a first block, T101, of "n" words of FAST control data where n merely represents an integer value. The second block of control data, T102, represents "m" words of control data designated as "not quite as fast" data (hereinafter referred to as NQAF data) where m represents an integer vale distinct from the integer value n of words of FAST data. As previously discussed, the present invention provides that each block of data will include 128 words of data which, as shown in FIG. 3 are represented as a first and a last word of data for each block. For purposes of this disclosure, it is presumed that there can be two categories of control data which are termed FAST data and NQAF data. It has been determined that for typical distributed process control systems, this is a valid presumption with the distinction between the two categories of control data arising out of the need to update the FAST data typically in a 5 millisecond time period and the NQAF data typically in a 30 millisecond time period. For purposes of later discussions, the 5 millisecond time period should be considered a timing goal; that is, it is the predetermined time by which the most critical data must be refreshed to the memory locations of all of the stations connected to the serial communications bus 60.

By organizing the memory area in a manner whereby pairs of contiguous blocks of control data are reserved for a particular station, the present invention provides an easy means by which modifications to the overall system can be made without requiring that significant modifications be made to the memory offset designations at each of the stations. In other words, memory space is reserved for future use without requiring that already defined data be moved as additional stations are added to the system. It should also be understood that the various stations are not restricted to a single block of control data apiece; for an individual station, if more than one block of control data is necessary, it would be preassigned to that station in a contiguous relationship to the previously assigned blocks of control data. By assigning multiple blocks to individual stations, however, it must be understood that the number of stations of the distributed process control system that can handle control data will no longer be equal to the number of blocks that can handle control data.

Separating the first block of FAST data T101 and the first block of NQAF data T102, is a reserved space of FAST data T101a which allows for each block of control data to expand to the maximum size of 128 words. Additionally, separating the first block of NQAF data T102 from the second block of FAST data T103, is a reserved space of NQAF data T102a. This pattern of one block of FAST data followed by a reserved space of FAST data and then the next block of NQAF data is repeated throughout the memory area until the entire 128 blocks of data are assigned which, as seen in FIG. 3, results in the fact that the last block of each type of data is the 64th block.

Having established that, in a static situation, each of the stations maintains an identical memory area in terms of data contents and memory offset designations, it will now be discussed in relation to FIG. 4, that for dynamic operating conditions, each of the stations as well, assembles frames of control data in an identical manner. The frame of control data is the unit of data transmission for the communications arrangement of the present invention wherein every frame of control data, which are given specific fixed data lengths, are transmitted over the serial communications bus 60 according to a token passing method of bus arbitration. The token passing arrangement is configured so that only one frame of control data can be transmitted before the token must be passed to the next frame of control data as designated in the bus allocation list (BAL). In other words, bus mastership is limited to one transmit frame; the station which has possession of the token is considered to be the temporary bus master and that station will transmit one and only one frame of control data while it has possession of the token. Implicit within the operation of transmitting that one frame of control data is the operation of handing the token off to the next station in the bus allocation list (BAL).

The bus allocation list (BAL) is a table driven list that totally defines one logical rotation of the token. Once the communications arrangement of the present invention has been enabled, the contents of the bus allocation list (BAL) cannot be modified since the communications control processor 66, following enablement, performs the operation of copying the bus allocation list (BAL) from the common memory area to the onboard memory associated with the communications control processor 66. The control table T100 which occupies the first area of the common memory area includes information which initializes the bus allocation list (BAL). For purposes of this discussion, it will be assumed that the bus allocation list (BAL) can accommodate 256 frame slots although other quantities may be used depending on the size and type of memory device that the distributed process control system employs. The 256 frame slots corresponds to the maximum number of frames which may be transmitted during one token rotation. The token rotation begins with the station whose ID number is in slot 1 of the bus allocation list (BAL), that station will transmit one frame of control data and then pass the token on to the next station on the bus allocation list (BAL). This token passing operation will continue with successive slots until the end of the list is reached as indicated by the 256th slot or an invalid station ID for slot 255. The next token rotation will then begin immediately thereafter starting with the station that is assigned slot 1 in the bus allocation list (BAL). It should be noted that a station may have its ID number entered into the bus allocation list more than one time per token rotation thereby allowing it to be the bus master more than once per token rotation. It has been determined that to achieve the timing goal of 5 milliseconds to refresh FAST data to all of the stations, each frame should include 60 words of control data; therefore, if a particular station would require more than the allocated 60 words per frame of control data, that station would require more than one entry in the bus allocation list per token rotation.

The size and format of the frame of control data is fixed and is illustrated in FIG. 4. The communications control processor 66 constructs the frame of control data based upon parameters provided in a frame control table which will be described hereinafter in further detail in connection with FIG. 5. The information provided by the frame control table in conjunction with the information provided in the bus allocation list (BAL) allows the communication control processor 66 to determine the location of the FAST and NQAF data, the number of transmit slots assigned and the number and types of words of control data that are to be packed into each frame of control data.

As seen in FIG. 4, the frame of control data starts with a preamble which occupies all of the first frame section T200 and a portion of the second frame section T201. The preamble includes information which preconditions the serial communications bus 60 for the transmission of the frame of control data. The preamble allows for the proper synchronization of the communication modems 64 at all of the receiving stations. Also occupying a portion of the second frame section T201 is the opening flag information, shown for this example as including the data string (01111110). The opening flag signifies the beginning of the transmission of a frame of control data. Following the opening flag information in the frame of control data is a third frame section T202 which includes the token acceptance and passing information.

The frame of control data next includes a memory offset value at frame section T203 for the FAST data which indicates the starting position for loading the FAST data into the proper memory offset locations at the respective memory devices of the plurality of stations. Similar to the memory offset value for FAST data which is indicated at frame section T203, the frame of control data also includes a frame section T204 for indicating the starting memory offset value at the respective memory devices for the NQAF data. Frame section T205 of the frame of control data includes the information by which the communications control processor 66 can determine the number of the words of FAST and NQAF data that is included in this particular frame of control data. At this point, it should be noted that the number of words of control data that may be transmitted in a single frame is limited to 60; therefore, in determining the number of words of FAST and NQAF data that should go into the frame of control data, preference is given to filling up the allocated words with FAST data then, after all of the FAST data has been accommodated, beginning the transmission of the NQAF data. The next area of control data within the frame is dedicated to the actual control data itself, frame sections T206 through T208 are reserved for this purpose whether such control data is FAST data or NQAF data as determined by the values in the frame section T205.

Following the frame sections reserved for the use of the actual control data, the next frame section, T209, allows for the inclusion of a Cyclic Redundancy Check (CRC) in the frame of control data. The Cyclic Redundancy Check (CRC) is a method by which the integrity of the control data can be checked thereby allowing a fault detection means to be included along with the actual frame of control data. Filling in the remaining frame section T210 of the frame of control data, is the closing flag (01111110) which serves the purpose of indicating the conclusion of this frame of control data thereby allowing for the handing off of the token to the next station in the Bus Allocation List (BAL).

In order to build the frame of control data in the manner as set forth in FIG. 4, the communications arrangement of the present invention utilizes a frame control table as set out in FIG. 5. This table is constructed in terms of the number of blocks of control data that the communications arrangement can accommodate and illustrates the amount of data that is necessary to provide the information contained in the frame sections. The relationship between the number of frames of control data and the number of blocks of data is dependent on the number of words of FAST and NQAF data that the station originates. As previously discussed, each station accounts for a contiguous 2 blocks of control data with each block containing 128 words of control data. Additionally as previously discussed, a frame of control data can accommodate up to 60 words of control data. Therefore, if a station only originates a total of 60 words of FAST and NQAF data, one frame would be transmitted per token rotation. Under this example, the two blocks of data that would be assigned to this station would have a substantial amount of unused memory space which could be set aside for future expansion of this station. If a station originated a substantially larger number of words of FAST and NQAF data, of course, more frames of control data would be transmitted from this station and more than one token from the bus allocation list would have to be given to this location, the provisions for which have been previously discussed.

The above considerations for determining the construction of the frames of control data for any given station are set forth in the frame control table as illustrated in FIG. 5. For instance, the identification of the station that originates the frame of control data and the numbers and types of words that the station originates are provided by the frame control table. Additionally, the frame control table also provides the information which is needed to indicate that the particular station is in service and further, to indicate the total number of words of NQAF data that can be included in each frame of control data. As seen in FIG. 5, this information is provided by an amount of data as indicated along the righthand column. The frame control table includes this same amount of information for each of the pairs of 64 blocks. Additionally, the frame control table which includes this information for all of the pairs of 64 blocks of data is repeated at each of the stations thereby providing that each of the stations knows the considerations that are made for the construction of the frames of control data originating at each of the stations.

The data communications arrangement of the present invention provides an additional feature relating to an error recovery technique. By assigning that the stations having the first three slots in the bus allocation list (BAL) also include unique timeout values, this arrangement allows that, for situations where there has been an inactivity on the serial communications bus 60 for one of three distinct predetermined periods of time, the rotation of the token will be restarted. If one of the timeout periods of the three stations expires, a special frame entitled the restart handoff, will be sent which recreates the dropped token. At least one of the first three stations must be active for the data communications arrangement of the present invention to be enabled.

In the present configuration, the data communications arrangement supports a distributed process control system having 64 stations which originate control data; however, this arrangement also supports a total of 254 station ID numbers for which data other than control data can also be communicated although over a separate communications bus from the serial communications bus 60 of the present invention. In this manner, station ID numbers may be assigned independent of whether that station originates control data.

In the operation state, the communications arrangement of the present invention provides for a monitoring of the communications control processors 66 at each station. Each of the communications control processors 66 maintains a set of 64 counters, one for each of the pairs of data blocks. Each time a token handoff is processed, the counter which corresponds to the sending stations data blocks will be preset to 3. Once per token rotation, these counters will be decremented. If a counter transitions to zero, the corresponding "station in service" flag will be reset to indicate that the station has not transmitted in the last three token rotations. This implies that the data expected is stale and should be used with the proper precautions. If the counter transitions from zero to three, the "station in service" flag will be set to indicate that the station is alive and passing the token. These "station in service" flags are available to the functional processor 70 and may be checked as part of the control strategy.

In operation, once the data communications arrangement of the present invention is enabled, the communications control processor 66 at each station counts the number of slots allocated to it in the bus allocation list (BAL). Using this number along with the number of words FAST data which this station originates, the communications control processor 66 computes the number of words of FAST data that can be placed into each frame of control data. Additionally, recognizing that this computation will most likely result in there being at least one frame of control data that will have an extra word of FAST data, the communications control processor 66 also performs this calculation. Next, utilizing the frame control table of FIG. 5, the communications control processor 66 places the specified number of words of NQAF data into each frame of control data until there are less words of NQAF data remaining to be sent than there is allowed to be in a frame of control data. This remainder amount of words of NQAF data will then be sent along with a next frame of control data which includes FAST data.

The operation of the data communications arrangement of the present invention can best be illustrated by way of example where it can be appreciated that the performance is expressed in terms of the time required to update or refresh the entire memory image. The performance times can be separated according to whether the refresh time is for FAST data or for NQAF data and furthermore, can be estimated based upon the information in the frame control table. The actual results will vary only slightly with that which is calculated, this variation coming about as a result of a real signal propagation delay which for the present purposes, can only be estimated. To calculate the refresh time (Rt) for the FAST data, the following equation is used:

$$Rt = (Bd*Oh) + ((Fd+Sd)*Dt) + (Bd*Pd) + (Bn*To) \quad (1)$$

where:
Bd = Total number of frame slots used in the BAL;
Oh = Overhead per frame—97.4 microseconds for nonredundant systems or 110.3 microseconds for redundant systems;
Fd = Total number of words of FAST data to be refreshed per token rotation (all FAST data);
Sd = Total number of words of NQAF data to be transmitted per token rotation;
Dt = Data transmission time at 2MBps allowing for zero insertion (8.12 microseconds);
Pd = Estimate of propagation delay—0.15 microseconds (assumes approx. 100 feet between stations & 1.5 nanoseconds/ft);
Bn = Total number of frame slots reserved (spares—not available);
To = No response timeout period (110 microseconds)

It should be noted that for one of the above terms, the data transmission time (Dt), the estimate of zero insertion loss overhead is based upon a simulation done on 10,000 pseudo-random bit streams of 1040 bits apiece (the maximum length frame). On the average, zero insertion increased the frame length by 0.789%. This implies that an additional 0.06 microseconds is required per data word transferred over the serial communications bus 60. For purposes of the above calculation, twice this value was used to increase the margin for error. Additionally, for another of the above terms, the number of words of NQAF data to be transmitted (Sd), there must be another calculation performed based on the following equation:

$$Sd = (B1*M1) + (B2*M2) + \ldots (Bn*Mn) \quad (2)$$

where:
B1, B2, ..., Bn = the number of frame slots assigned to station 1, to station 2, to station n;
M1, M2, ..., Mn = the number of words of NQAF data allowed in each frame for station 1, station 2, etc.

In order to calculate the refresh time for the NQAF data, the following equation should be used:

$$Nt = (Nm/Bm) * Rt \quad (3)$$

where:
Nm = the integer number of frames required to transmit all of the words of NQAF data for this station;
Bm = the number of frame slots allocated to this station in the BAL.

The integer number of frames needed to transmit all of the words of NQAF data for a particular station can be calculated by means of the following equation:

$$Nm = (Wm + Mm - 1) / Mm \quad (4)$$

where:
Wm = the number of NQAF words for this station;
Mm = the number of NQAF words allowed in each frame for this station.

This is an integer operation and rounds this number upward.

Based on the above equations, a calculation of the refresh times for the FAST data and the NQAF data will be performed for a system having five stations and a timing goal for the refreshing of the FAST data of 5 milliseconds. Additionally, for this example, it will be assumed that there are no unused stations in the bus allocation list (BAL) The stations have the data requirements shown in columns two and three of Table 1 shown below. The number of slots required for each station to send its FAST data and some of its NQAF data were assigned as indicated in column four of Table 1 A calculation is then done to determine the FAST refresh time if no NQAF data is being broadcast. This distributed process control system network would require 3.925 milliseconds to refresh the FAST data image.

Based upon a timing goal of 5 milliseconds to refresh the FAST data, the additional times (1.075 milliseconds) will then be used to refresh the NQAF data. These additional words of NQAF data are then distributed as evenly as possible without exceeding the 60 word frame limit (see column 6 of Table 1). The total number of words of NQAF data refreshed per token rotation is shown for each station in column 8. Re-evaluating the memory image refresh indicates that the FAST data memory image will be updated every 4.997 milliseconds and the NQAF data memory image for each station will be refreshed in the time indicated in column 9.

TABLE 1

| 1 Node Number | 2 FAST DATA | 3 NQAF DATA | 4 Slots Req | 5 FAST Size | 6 NQAF Size | 7 Frame Size | 8 Total NQAF | 9 NQAF Refresh |
|---|---|---|---|---|---|---|---|---|
| 1 | 40 | 80 | 1 | 40 | 15 | 55 | 15 | 29.98 |
| 2 | 80 | 160 | 2 | 40 | 15 | 55 | 30 | 27.48 |
| 3 | 121 | 240 | 3 | 41 | 15 | 56 | 45 | 26.65 |
| 4 | 30 | 60 | 1 | 30 | 14 | 44 | 14 | 24.99 |
| 5 | 90 | 180 | 2 | 45 | 14 | 59 | 28 | 32.48 |

Using equations (1) and (2) and the values from Table 1, the following variables were used to determine the FAST data refresh time of 4.997 milliseconds:

$Bd = 1 + 2 + 3 + 1 + 2 = 9$ frames;
$Fd = 40 + 80 + 121 + 30 + 90 = 361$ words (FAST)
$Sd = (1 \times 15) + (2 \times 15) + (3 \times 15) + (1 \times 14) + (2 \times 14) = 1\text{-}32$ words (NQAF)
$Pd = 0.15$ microsecond/frame
$Oh = 110.3$ microsecond/frame
$Dt = 8.12$ microsecond/word of data
$Bn = 0$ (no frames reserved)
$To = 110$ microsecond per frame reserved which yields the following result for equation (1):

$Rt = (9 \times 110.3) + ((361.132) \times 8.12) + (9 \times 0.15) + (0 \times 1\text{-}10) = 4.997$ milliseconds.

Although the hereinabove described embodiment constitutes a preferred embodiment of the invention, it can be appreciated that amendments may be made thereto without departing from the scope of the invention, as set forth in the appended claims.

We claim:

1. A method of efficiently communicating data between a plurality of stations in a distributed process control system comprising the steps of:
   separating data at each station into at least a first and second category of data;
   designating said first category of data as fast data;
   preselecting a timing goal by which all of such fast data must be refreshed to at least a portion of the plurality of stations;
   constructing a frame of data to be refreshed during such timing goal, said frame of data being constructed at initiation of system operation according to the steps of
   a. calculating an actual time by which all of such fast date will be refreshed among said plurality of stations;
   b. determining a time difference between such timing goal and such actual time;
   c. calculating a remainder amount of such second category of data that can be transmitted during such time difference;
   d. assembling said frame of data to be transmitted to the plurality of stations by adding such remainder amount of said second category of data to all such fast data to be transmitted during such preselected timing goal;
   designating data originating from any one of the plurality of stations as stale data if a node in service flag associated with any one of the plurality of stations is set to indicate that a counter at said any one of the plurality of stations has been decremented to a zero count without having refreshed the data originating therefrom; and
   transmitting said assembled frame of data without station address information.

2. A data communication method as set forth in claim 1 wherein said data is separated between said first category of data and said second category of data as a function of a predetermined priority designation of all of the data present at each of the plurality of stations.

3. A data communication method as set forth in claim 1 further comprising the step of assigning a bus mastership to one of the plurality of stations for the transmission of one frame of data and, following such transmission, passing such bus mastership onto a next station as determined from a bus allocation list.

4. A data communication method as set forth in claim 1 further comprising the step of assigning a distinct timeout period to at least a first and a second station among the plurality of stations, the first and second station being determined by a reading of an order of the plurality of stations as set out in a bus allocation list, the distinct timeout period corresponding to a time after which, if there has been an absence of activity of a communication bus, a restart of transmissions of data will occur.

5. A data communications method as set forth in claim 1 wherein said counter originates with a count of three and is decremented one count each time a data transmission of the data for all of the plurality of stations is completed without new data being originated from said any one of the plurality of stations.

6. A data communication method as set forth in claim 5 further comprising the step of assigning a bus mastership to one of the plurality of stations for the transmission of one frame of data and, following such transmission, passing such bus mastership onto a next station as determined from a bus allocation list.

7. A data communication method as set forth in claim 6 further comprising the step of assigning a distinct timeout period to at least a first and a second station among the plurality of stations, the first and second station being determined by a reading of an order of the plurality of stations as set out in a bus allocation list, the distinct timeout period corresponding to a time after which, if there has been an absence of activity of a communication bus, a restart of transmissions of data will occur.

8. An arrangement for communicating data which has been separated into at least into at least a first and second category of data as a function of a predetermined timing priority for refreshing such data among a plurality of processor controlled stations of a distributed process control system, said communication arrangement comprising:

- a communications processor at each of the plurality of stations which is in signal communication with a communication bus on which the plurality of stations are disposed;
- a dual port memory element at each of the plurality of stations and coupled on one port to said communications processor;
- a control processor in signal communication with a second port of said dual port memory element and effective such that the process of the distributed process control system is carried out thereby;
- said communications processor including means for assembling a frame of in which the first category of data is assigned a timing preference over said second category of data, said assembled frame of data including a preassigned arrangement of said first and second categories of data whereby all of said first category of data is transmitted before said second category of data, said preassigned arrangement of data being selected at initiation of system operation according to a preselected timing goal;
- means for calculating an actual time for transmitting all of the first category of data and subtracting such actual time from said preselected timing goal to determine a timing difference;
- means for determining a remainder amount of the second category of data as can be transmitted in the timing difference and adding such remainder amount to the first category of data to be transmitted therewith; and
- means for designating data originating from any one of the plurality of stations as stale data if a node in service flag associated with said any one of the plurality of stations is set to indicate that a counter at said any one of the plurality of stations has been decremented to a zero count without having refreshed the data originating therefrom.

9. A data communicating arrangement as set forth in claim 8 wherein said data is separated between said first category of data and said second category of data as a function of a predetermined priority designation of all of the data present at each of the plurality of stations.

10. A data communications arrangement as set forth in claim 8 further comprising means for assigning bus mastership to one of the plurality of stations for the transmission of one frame of data and, following such transmission, passing such bus mastership onto a next station as determined from a bus allocation list.

11. A data communication arrangement as set forth in claim 8 further comprising means for assigning a distinct timeout period to at least a first and a second station among the plurality of stations, the first and second station being determined by a reading of an order of the plurality of stations as set out in a bus allocation list, the distinct timeout period corresponding to a time after which, if there has been an absence of activity of a communication bus, a restart of transmissions of data will occur.

12. A data communications arrangement as set forth in claim 8 wherein said counter originates with a count of three and is decremented one count each time a data transmission of the data for all of the plurality of stations is completed without new data being originated from said any one of the plurality of stations.

13. A data communications arrangement as set forth in claim 12 further comprising means for assigning bus mastership to one of the plurality of stations for the transmission of one frame of data and, following such transmission, passing such bus mastership onto a next station as determined from a bus allocation list.

14. A data communication arrangement as set forth in claim 13 further comprising means for assigning a distinct timeout period to at least a first and a second station among the plurality of stations, the first and second station being determined by a reading of an order of the plurality of stations as set out in a bus allocation list, the distinct timeout period corresponding to a time after which, if there has been an absence of activity of a communication bus, a restart of transmissions of data will occur.

15. A data communications arrangement as set forth in claim 8 wherein said assembled frame of data is transmitted to at least a portion of the plurality of stations without station address information.

* * * * *